Oct. 19, 1948.    W. E. BARNES    2,451,605
APPARATUS FOR MEASURING DENSITY OF A THIXOTROPIC FLUID
Filed June 12, 1946    2 Sheets-Sheet 1

INVENTOR
WILLIAM E. BARNES
BY
ATTORNEYS

Oct. 19, 1948.       W. E. BARNES       2,451,605
APPARATUS FOR MEASURING DENSITY OF A THIXOTROPIC FLUID
Filed June 12, 1946                    2 Sheets-Sheet 2

INVENTOR
WILLIAM E. BARNES
BY
ATTORNEYS

Patented Oct. 19, 1948

2,451,605

UNITED STATES PATENT OFFICE 2,451,605

APPARATUS FOR MEASURING DENSITY OF A THIXOTROPIC FLUID

William E. Barnes, Beaumont, Tex., assignor to Sun Oil Company, Philadelphia, Pa., a corporation of New Jersey Application June 12, 1946, Serial No. 676,203

2 Claims. (Cl. 73—32)

This invention relates to means for determining the density of a fluid and is particularly adapted for use in determining the density of a thixotropic fluid such as the drilling mud used in the rotary drilling of wells.

In drilling wells by the rotary method, drilling mud is circulated down through the drill pipe and up through the annular space between the drill pipe and borehole. The mud functions to remove the cuttings from the borehole, to prevent caving of the borehole wall and to provide sufficient hydrostatic pressure to overcome the pressure of the formations penetrated. A close control of the density of the drilling mud throughout the drilling operation is generally highly desirable. On the one hand, it is necessary that the weight of the drilling mud be sufficient to provide a hydrostatic pressure adequate to hold back fluids such as gas or water in the formations encountered in order to prevent a blowout of the borehole. On the other hand, if the drilling mud becomes too heavy, the drilling fluid may be continuously forced into one or more of the formations penetrated resulting in the condition known as "lost circulation." During the course of the drilling frequent adjustment of the weight of the mud, as by the addition of weighting materials, is required to meet the varying conditions encountered. For instance, upon penetration of a gas sand, the mud stream may become considerably lighter due to absorption of gas, in which case it is important that the change in density of the mud fluid be detected immediately so that proper steps may be taken to increase the weight of the circulating mud and prevent a blowout. In some cases a variation in mud weight of only a small fraction of a pound per gallon may be sufficiently important to constitute the difference between satisfactory and unsatisfactory drilling progress. It is evident, therefore, that a continuous accurate measurement of the mud density during the drilling operation is highly desirable.

It is an object of the present invention to provide apparatus for continuously measuring the density of a circulating fluid, which apparatus is designed specifically to operate on a thixotropic fluid such as drilling mud and to minimize inaccuracies of measurement tending to arise as a result of its thixotropic character.

The density measuring apparatus according to the invention utilizes the difference in pressure on two flexible diaphragms, vertically spaced within the fluid, as an indication of the fluid density. While other density measuring devices operating on a similar principle have been known heretofore, such devices have not been designed so as to be capable of accurate measurement when the fluid being measured has a thixotropic character, i. e. the tendency to undergo gelation when quiescent but readily to revert to a fluid state upon agitation. I have found that density measuring apparatus which includes flexible diaphragms designed to contact the drilling fluid is apt to be subject to considerable error of measurement due to gelation of the drilling fluid adjacent the diaphragms.

According to the present invention, such errors in measurement are substantially eliminated by providing means for agitating the drilling fluid during its passage through the apparatus and by so positioning the flexible diaphragms as to permit a free flow of fluid across the diaphragms and thereby prevent gelation.

In particular the invention provides apparatus especially adapted for use where the drilling rig installation has a low substructure. When the drilling installation is of this type, the drilling fluid returning from the well bore issues therefrom at sufficiently low level that the drilling fluid is not available to flow through the testing apparatus by gravity. In such cases there is provided as a part of the apparatus means for pumping the drilling fluid from the mud ditch into the apparatus and simultaneously agitating the drilling fluid within the apparatus to prevent gelation.

For a more complete understanding of the invention reference may be had to the accompanying drawings in which.

Figure 1:
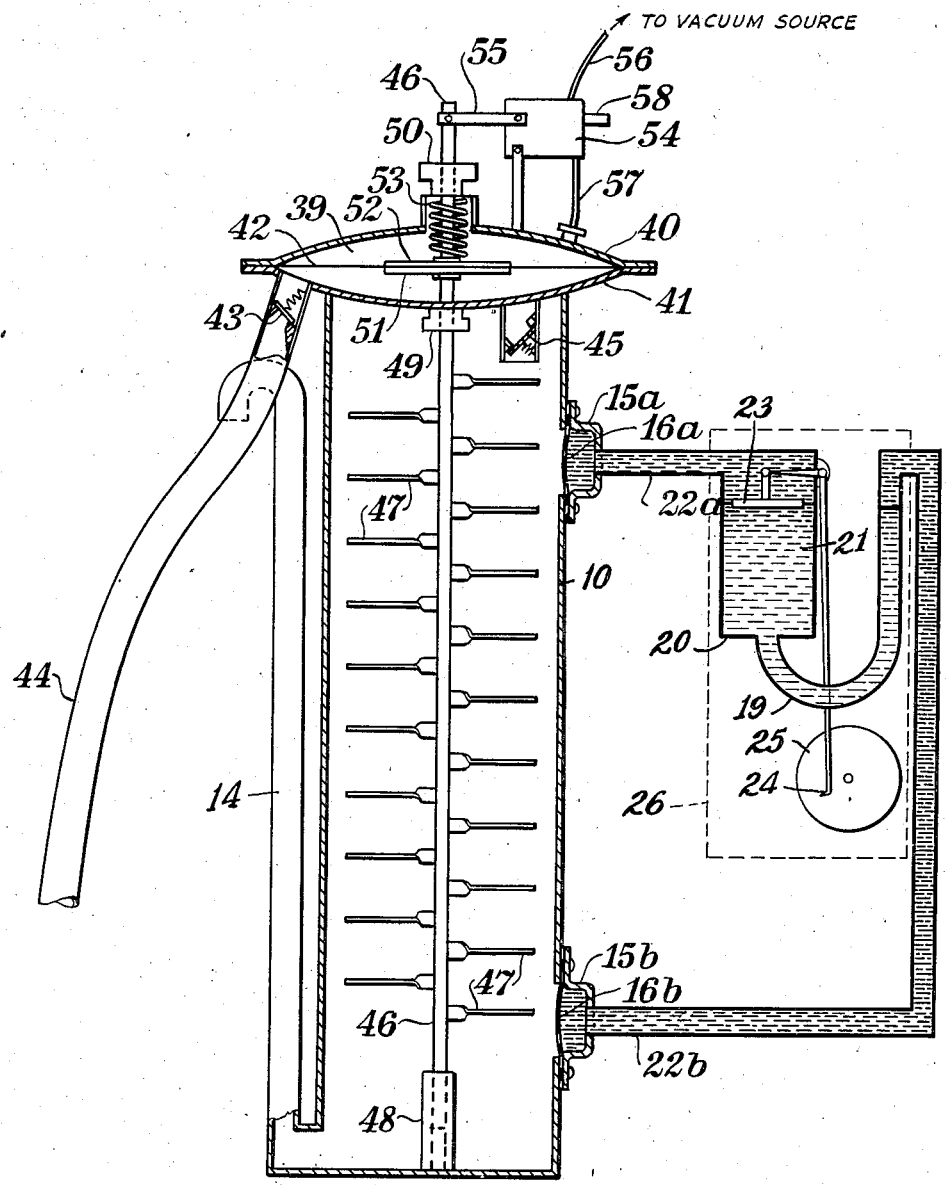
Figure 1 is a partly sectioned elevational view of one form of the apparatus adapted for use where gravity flow of the fluid is not readily available.

Figure 1 shows one form of the device particularly adapted for use where the drilling rig installation has either a low sub-structure or no sub-structure. This form of the device includes means for pumping drilling fluid from the mud ditch into the chamber 10, and for simultaneously agitating the drilling fluid therein to prevent gelation. For this purpose there is provided a diaphragm type pump, indicated generally at 39, comprising upper and lower housing members 40 and 41 and flexible diaphragm 42 positioned therebetween and forming therewith upper and lower sections. The lower housing member 41 is provided with an inlet including a check valve 43 adapted to permit flow of drilling fluid into the lower section of the pump. Valve 43 is connected to drilling fluid supply line 44 which runs to the mud ditch (not shown). The lower housing member 41 is provided also with a fluid outlet through which the drilling fluid may flow into chamber 10. A check valve 45 is located in the outlet so as to permit flow only in an outward direction at this point.

Located within chamber 10 is a stirring device comprising a rod 46 having attached thereto a plurality of fins 47 for agitating the fluid within the chamber as the stirring device is caused to reciprocate as described below. The lower end of rod 46 is loosely held in a socket 48 fixed to the bottom of the chamber. Toward its upper end rod 46 extends through packing glands 49 and 50 carried respectively by the lower and upper housing members 41 and 40. Rod 46 likewise extends through diaphragm 42 and is securely attached thereto by means of plates or nuts 51 and 52 between which the diaphragm is held. Positioned between the upper packing gland 50 and plate 52 is spring 53 which urges diaphragm 42 in a downward direction.

A pilot valve 54 is connected to rod 46 near its upper end by means of link 55. The pilot valve is in communication with a source of vacuum through line 56 and with the upper section of the diaphragm pump through line 57, and is also provided with a vent shown at 58. The pilot valve, which may be of known design and preferably is of the snap action type, is adapted to be actuated in accordance with the movement of link 55 caused by reciprocation of rod 46. Thus, when rod 46 is at its lower position, the upper section of the pump will be connected to the vacuum source; whereas when rod 46 is at its upper position, the upper section of the pump will be cut off from the vacuum source and will be open to the atmosphere through vent 58.

In operating the pump, diaphragm 42 will be urged downward by spring 53 until a predetermined lower position is reached at which point pilot valve 54 will be actuated so as to connect the upper section of the pump with the vacuum source. As the upper section is evacuated, diaphragm 42 will move upward and, due to closure of check valve 45, will create a partial vacuum in the lower section of the pump, causing drilling fluid to be sucked up from the mud ditch through line 44. When the diaphragm reaches a predetermined upper position, the pilot valve will be actuated to cut off the vacuum source and to admit air from the atmosphere through vent 58 and line 57 into the upper section of the pump. Spring 53 will then urge the diaphragm downward. Check valve 43 will close while check valve 45 will open, thereby causing drilling fluid to be forced into passageway 10. When the diaphragm reaches the predetermined lower position, pilot valve 54 will again be actuated for evacuation of the upper section of the pump and the operation will be repeated. It may be seen, therefore, that the pump will produce a continual flow of drilling fluid from the mud ditch into the apparatus and at the same time effect agitation of the fluid within the apparatus by the reciprocal movement of the stirring device.

Figure 2:
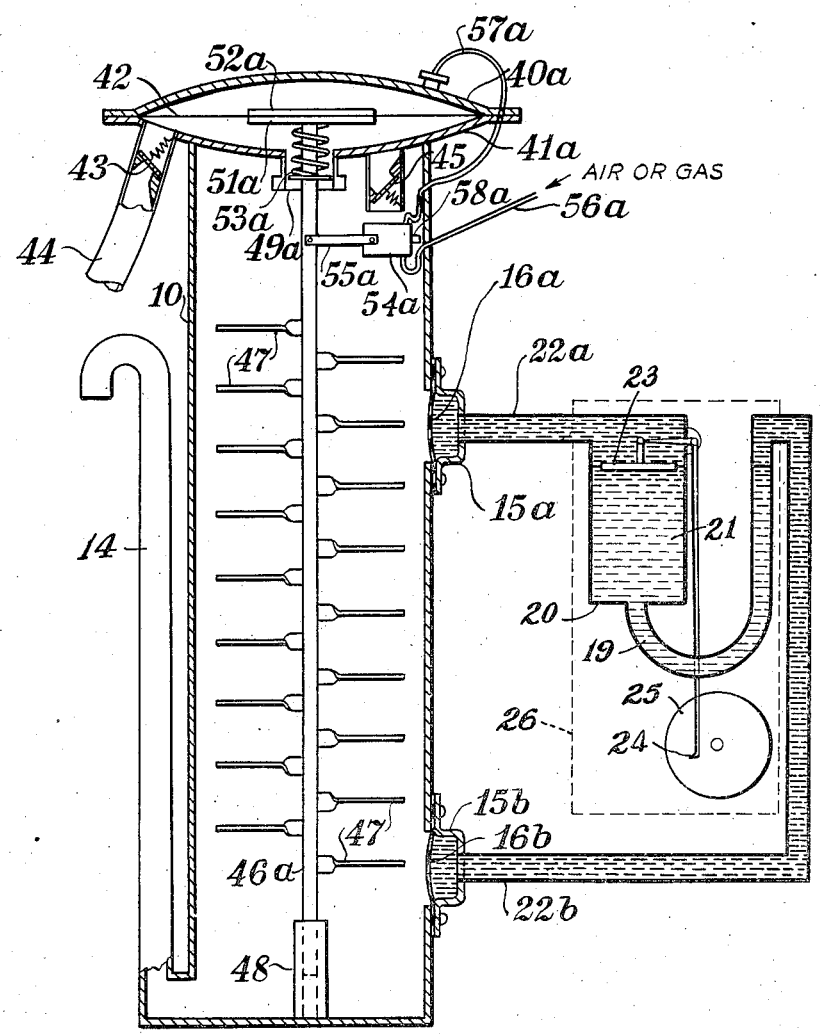
Figure 2 is another modification of the apparatus for use where gravity flow is not available.

Figure 2 shows another form of the apparatus which differs from that shown in Figure 1 mainly in that the diaphragm type pump is arranged to be driven by means of air or gas under pressure rather than by vacuum. As shown in Figure 2, the pump, comprising upper and lower housing members 40a and 41a separated by diaphragm 42, is connected with inlet line 44 including check valve 43 and has an outlet to vertical chamber 10 through check valve 45 all as described in connection with Figure 1. In this case, however, rod 46a extends through packing gland 49a and only up to diaphragm 42 to which it is secured by means of plates 51a and 52a. Spring 53a is located between packing gland 49a and plate 51a to urge the diaphragm 42 upward. Pilot valve 54a, which is of the same type as described in connection with Figure 1, is located beneath the lower housing member 41a and is attached to rod 46a by means of link 55a for actuation in accordance with the reciprocal movement of the rod. Air or gas under pressure is supplied to the pilot valve through line 56a. The pilot valve communicates with the upper section of the pump through line 57a and carries a vent shown as 58a. In this case, when rod 46a is at an upper position, the pilot valve will connect line 57a to air line 56a and cause air to be admitted to the upper section of the pump thereby forcing the diaphragm, together with rod 46a, downward. When a predetermined lower position is reached, pilot valve 54a will operate to disconnect air line 56a and to connect line 57a with vent 58a thereby relieving the pressure above the diaphragm. Spring 53a will then force the diaphragm and rod 46a to an upper position at which point the pilot valve will again operate to admit air to the upper section of the pump and repeat the cycle. It is evident that the resulting operation of the pump will serve to pump the drilling fluid into the apparatus and at the same time agitate the fluid therein in the same manner as described for Figure 1.

Associated with the passageway or chamber 10 are a pair of vertically spaced apart housings 15a and 15b and two flexible membranes or diaphragms 16a and 16b held by the housings. While the housings may extend within the chamber, if desired, and the diaphragms need not necessarily be fixed in vertical position, provided the arrangement is such as to permit substantially unobstructed flow of fluid across each of the diaphragms, the arrangement illustrated in Figure 1 is preferred. As shown in Figure 1 the housings 15a and 15b are positioned over openings in the wall of the chamber 10 and are secured to the wall by means of bolts while the diaphragms are anchored between the housing 15a and the chamber wall 10. In order to minimize the effect of the wall as an obstruction to the free flow of fluid across the diaphragm, the wall thickness should be small relative to the width of the opening over which the diaphragms are positioned, and the edge of the wall around the apertures may be beveled. An overflow line 14 is provided in order to maintain the level of the liquid in chamber 10 above the upper diaphragm 16a.

A differential pressure indicating device is provided for measuring the difference in pressures exerted on the diaphragms by the fluid as an indication of the density of the fluid. For this purpose any suitable type of differential pressure device may be employed. As diagrammatically illustrated in Figure 1, the device may comprise a U-tube 19 having enlarged section 20 and containing mercury 21. The housings 15a and 15b are in communication with separate legs of the U-tube 19 by means of lines 22a and 22b, respectively. Lines 22a and 22b, as well as the space enclosed by each of the housings with its diaphragm, are filled with a liquid such as water or oil for transmitting the pressure exerted by the drilling fluid on each diaphragm to the differential pressure device. Enlarged section 20 of the U-tube contains float 23 which is adapted to float at the surface of the mercury 21 and to rise and fall in accordance with changes in its level. Float 23 is connected with scriber 24 through any conventional or suitable means for actuating the scriber in accordance with the movement of the float. Associated with scriber 24 is chart 25 driven by a clock mechanism and calibrated to show the density of the fluid being measured. Numeral 26 indicates an instrument panel (shown in broken lines) upon which the differential pressure indicating and recording device may be mounted.

What I claim and desire to protect by Letters Patent is:

1. Apparatus for continuously measuring the density of a circulating drilling fluid during the drilling of a well, where the drilling installation is such that the drilling fluid is normally unable to flow by gravity from the main fluid stream into the apparatus, which comprises a vertical chamber for the flow of a minor portion of the main stream of drilling fluid, an inlet adjacent the top and an outlet adjacent the bottom of the chamber, pumping means for feeding a minor portion of the main stream of drilling fluid through said inlet into the chamber, a pair of cooperating diaphragms positioned at different levels within the chamber and each adapted to be flexed by the pressure of the fluid obtaining in the chamber at its level, agitating means within the chamber, said pumping means being arranged to actuate the agitator and prevent gelation of the fluid, a differential pressure indicating device and means for transmitting the pressure exerted by the fluid on each diaphragm to said device.

2. Apparatus for continuously measuring the density of a circulating drilling fluid during the drilling of a well, where the drilling installation is such that the drilling fluid is normally unable to flow by gravity from the main fluid stream to the apparatus, which comprises a vertical chamber having an inlet at the top and an outlet at the bottom for continuously receiving and discharging a minor portion of the main stream of drilling fluid, said chamber having a pair of vertically spaced apart apertures in the chamber wall, a diaphragm secured adjacent to and closing each aperture, said diaphragms being adapted to be flexed by the pressure of the fluid obtaining in the chamber at the different levels, means for maintaining the level of the fluid in the chamber above the upper diaphragm, a diaphragm type pump having an inlet in communication with said main stream of drilling fluid and a fluid outlet communicating with the inlet of said chamber, a fluid agitating device located within said chamber and operable by said pump, each of said diaphragms being positioned in the chamber in a manner to permit the agitated fluid to flow freely thereacross and thereby prevent gelation of fluid adjacent each diaphragm, a differential pressure indicating device and means for transmitting the pressure exerted by the fluid on each diaphragm to said device.

WILLIAM E. BARNES.

REFERENCES CITED

The following references are of record in the file of this patent:

UNITED STATES PATENTS

| Number | Name | Date |
| --- | --- | --- |
| 1,136,789 | Fritchle | Apr. 20, 1915 |
| 1,878,801 | Perkins | Sept. 1, 1932 |
| 2,115,520 | Decker | Apr. 26, 1938 |
| 2,279,254 | Irwin | Apr. 7, 1942 |